Jan. 7, 1930.  C. W. MANZEL  1,742,446

LUBRICATING SYSTEM

Filed April 22, 1925  2 Sheets-Sheet 1

Inventor;
Charles W. Manzel,
by Geyer & Geyer
Attorneys.

Jan. 7, 1930.  C. W. MANZEL  1,742,446
LUBRICATING SYSTEM
Filed April 22, 1925    2 Sheets-Sheet 2
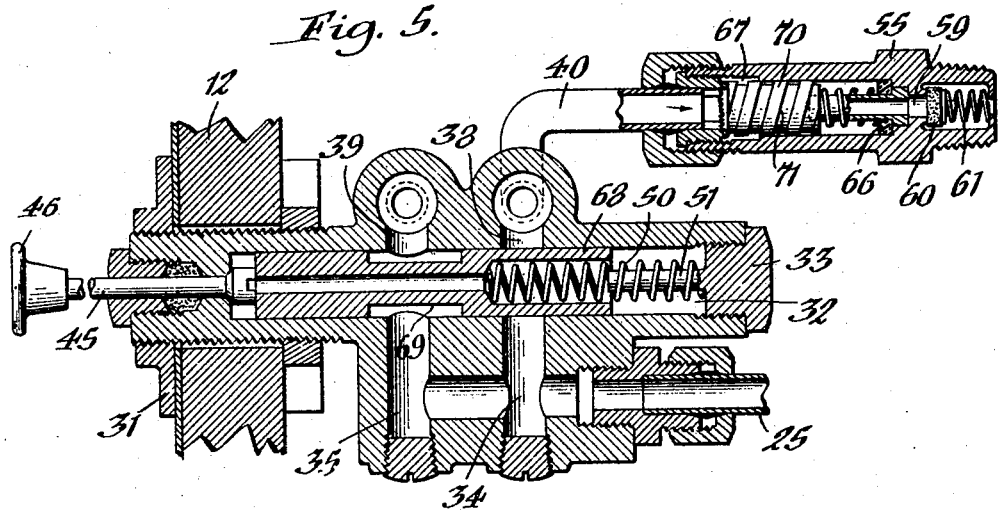
Inventor
Charles W. Manzel,
by Geyer & Geyer
Attorneys.

Patented Jan. 7, 1930

1,742,446

UNITED STATES PATENT OFFICE

CHARLES W. MANZEL, OF BUFFALO, NEW YORK

LUBRICATING SYSTEM

Application filed April 22, 1925. Serial No. 24,997.

This invention relates to improvements in a centralized chassis lubricating system for automobiles and other vehicles.

One of its objects is to provide a lubricating system of this character which is operatively connected with the oiling system of the vehicle-engine and which is readily and conveniently controlled from the driver's seat.

Another object of the invention is to provide a simple, inexpensive and easily operated valve-mechanism for controlling at will the admission of lubricant, under pressure, from the source of supply to the various measuring units or metering valves connected with the bearings to be lubricated.

In the accompanying drawings:—

Figure 1:
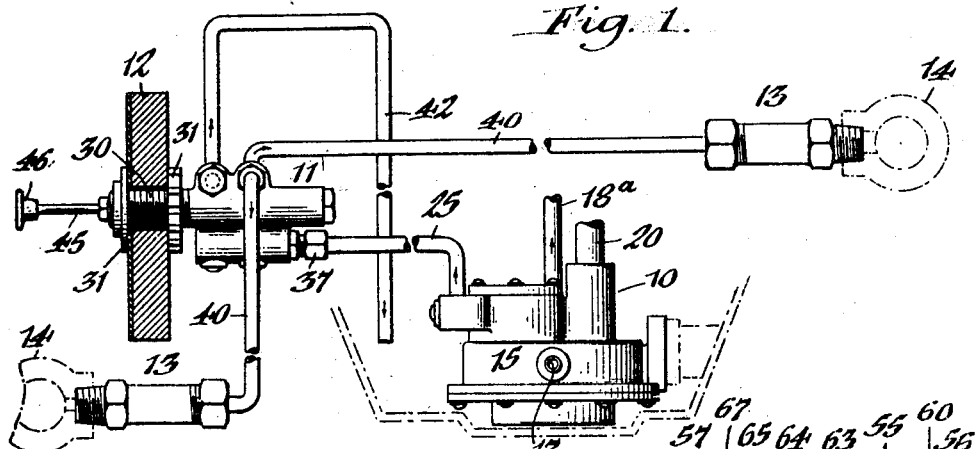
Figure 2:
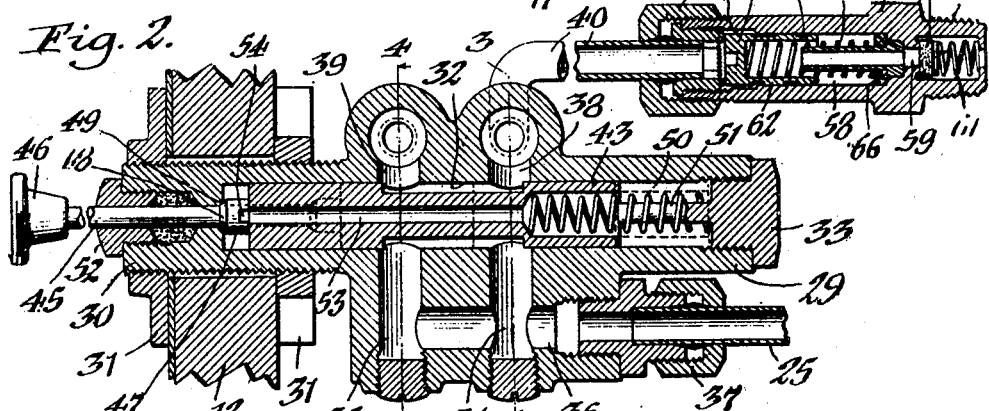
Figures 3, 4:
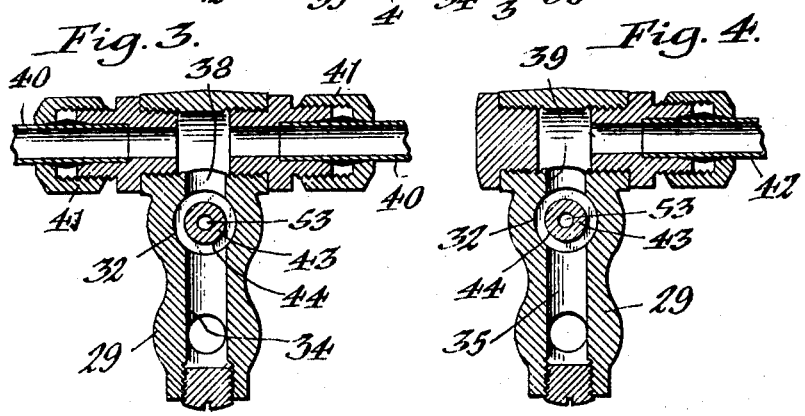

Figure 1 is a side elevation of the apparatus embodying my invention. Figure 2 is an enlarged vertical longitudinal section of the controlling valve and one of the measuring units of a bearing. Figures 3 and 4 are transverse sections on the correspondingly numbered lines in Fig. 2. Figure 5 is a sectional view, similar to Fig. 2, showing a modified form of the invention. Figure 6 is a vertical section of one form of pressure pump used in connection with the system. Figure 7 is a horizontal section thereof on line 7—7, Fig. 6. Figure 8 is a detached side elevation of the pump-blade.

Similar characters of reference indicate corresponding parts throughout the several views.

Referring more particularly to Fig. 1 which shows the arrangement of the parts included in the lubricating system, 10 indicates a high pressure oil pump driven from the motor of the vehicle in any suitable manner, and 11 a controlling valve mounted on the dash board 12 of the vehicle and interposed between the pump and the various measuring units or metering valves 13, two of which are shown in the drawings applied to the bearings 14 to be lubricated and constructed to deliver a predetermined quantity of lubricant to said bearings whenever said controlling valve is opened.

The pump shown in Figs. 6 and 7 of the drawings, by way of example, may be located in the oil pan of the vehicle-motor, and preferably comprises a casing 15 having a low pressure chamber 16 containing an oil inlet 17 from an oil outlet 18, the latter having a pipe 18ª leading therefrom for conducting and circulating the oil at low pressure in the usual manner to the various parts of the vehicle-motor requiring lubrication. Operating in the chamber are a pair of gears 19, 19 which force the oil from the inlet to the outlet side thereof and which are mounted on vertical shafts 20, 21, respectively, the shaft 20 being driven from the vehicle-motor in any well known manner. Surmounting the low pressure chamber and communicating therewith through a port 22 extending laterally from the low pressure outlet 18 is a substantially cylindrical high pressure chamber 23 having an outlet port 24 connected by a pipe 25 with the controlling valve 11. A rotor 26 is eccentrically disposed within the high pressure chamber and is mounted on the upper end of the shaft 21. Carried by the rotor to turn therewith but free to slide diametrically thereof, is a blade 27 whose ends are rounded or convex and engage the walls of the chamber 23, the length of the blade being equal to that of the diameter of said chamber. As the rotor revolves, the blade reciprocates relative to the rotor in an obvious manner and forces the oil at a high pressure through the outlet port 24, from whence it is either circulated through the controlling valve back into the oil pan or delivered to the measuring units applied to the bearings. The blade is preferably provided with a series of transverse slits 28 so that it is more or less yieldable in the direction of its length, the same being compressed when the pressure developed by the pump exceeds, say, 500 pounds, thereby allowing the oil to pass over the ends of the blade and relieving the pressure accordingly.

The controlling valve 11, in the preferred embodiment thereof shown in Figs 1–4 inclusive, comprises a casing or body 29 having an externally-threaded rear portion 30 extending through an opening—in the dashboard 12 and fastened thereto by the clamping nuts 31. Extending substantially the full length of the valve-body is a cylindrical bore 32 which is closed at its rear end and provided at its front end with a screw plug 33. Intermediate its ends, the valve body has a pair of spaced inlet ports 34, 35 which open at their upper ends into the lower side of the cylinder 32, while their lower ends communicate with an oil inlet passage 36 to which the outlet end of the pipe 25 is connected, as by a suitable coupling 37. Arranged in the upper side of the cylinder and substantially in axial line with the ports 34, 35 are corresponding outlet ports 38, 39, respectively, the port 38 having one or more pipes 40 connected thereto, as by couplings 41, which lead to the measuring valves 13, while the port 39 has a return pipe 42 connected therewith which empties into the oil pan of the engine.

A piston-valve or plunger 43 is slidably mounted in the cylinder 32 and controls the discharge of oil therefrom, either to be circulated from the pump back to the oil pan or delivered to the measuring valves. For this purpose, it has a reduced portion or annular groove 44 intermediate its ends which is of the proper length to normally bridge the opposing pairs of inlet and outlet ports 34, 35 and 38, 39, respectively, and forms a port or by-pass through which the oil is conducted from the inlet to the outlet side of the valve-body. An actuating rod 45 extends through the rear end of the valve-body and is provided at its outer end with an operating knob 46 and at its inner end with a head 47 which abuts against the opposing end of the piston-valve. At the junction of the head and its rod, a rearwardly-facing shoulder 48 is formed which normally engages a seat 49 at the opposing end of the cylinder 32. A spring 50 housed partly within the valve and encircling a guide stem 51, preferably formed on the plug 33, serves to hold the valve in its normal retracted position, shown by full lines in Fig. 2, in which position both sets of inlet and outlet ports are in communication with each other. A packing nut 52 applied to the rear end of the valve-body prevents leakage of oil past the valve-actuating rod 45. Extending from end to end of the piston-valve 43 is a longitudinal equalizing passage 53 for displacing the oil from one end of the cylinder to the other as the valve is reciprocated therein, the column of oil contained in the cylinder and valve-passage oscillating back and forth in one direction or the other as the piston valve is moved forwardly or backwardly. In order to effect an equal displacement of the oil at each end of the cylinder, the guide stem 51 and actuating rod 45 are of the same diameter and the length of said guide stem is substantially equal to that of the piston-stroke. As shown in Fig. 2, the actuating rod-head 47 has a transverse groove 54 facing the corresponding end of the oil-conducting passage 53 for establishing communication between the latter and the rear end of the cylinder. The forward movement of the piston-valve is limited by its front end abutting against the opposing inner end of the screw-plug 33, while its rearward movement is limited by the shoulder 48 of its actuating rod engageing the seat 49. In the forward position of the valve, shown by dotted lines in Fig. 2, its groove 44 breaks register with the companion inlet and outlet ports 35, 39, but maintains registration with the other set of companion inlet and outlet ports 34, 38, so that at this time the oil is prevented from circulating through the pipe 18ª while it continues to circulate at full pressure through the pipe or pipes 40 leading to the respective measuring valves 13.

The preferred type of measuring valves used in connection with this system for delivering a predetermined quantity of oil to the bearings each time the controlling valve 11 is opened consists of a nipple or fitting 55 having a threaded neck 56 at its outlet end for fastening it to a suitable distributer or directly to the bearing in the manner shown in Fig. 1, while its inlet end has a clamping nut 57 for securing the pipe 40 thereto. Extending lengthwise of the nipple in a cylinder 58 which communicates at its inlet end with said pipe while its outlet end terminates in a port 59 controlled by a spring-pressed check-valve 60, the spring 61 thereof being of the proper tension to normally keep its valve closed when the pump 10 is in operation and the controlling valve 11 is in its normal position, shown by full lines in Fig. 1. Operable in the cylinder is a hollow piston-valve 62 which is normally held in its retracted position shown in Fig. 2 by a spring 63, and is provided in its exterior face with a spiral oil-conducting groove 64 extending from its open end to a point short of its rear portion or head 65 which is ungrooved and serves to close off said groove and prevent the admission of oil to the cylinder shortly after the piston-valve starts its forward movement to expel the lubricant therefrom into the bearing connected therewith. The forward movement of the piston-valve is limited by a packing 66 located at the bottom or front end of the cylinder. Said hollow piston-valve and that portion of the cylinder in front of the same together constitute a measuring chamber which holds a predetermined quantity of oil. At its rear or inlet end, the cylinder 58 terminates in a counterbore or enlargement 67 into which the oil is first delivered before being conducted through the spiral groove into the measuring chamber. On the return or backward stroke of the piston-valve, a vacuum is created in said chamber and due to this reduction or pressure another charge of oil is forced into the chamber through the spirally-ported valve. During the ordinary circulation of the oil from the pump and while the controlling valve 11 is in its normal position, the piston-valve 62 remains in its retracted position, being unaffected by the low pressure normally developed by the pump. The moment the actuating rod 45 of the controlling valve is pushed inward to allow the full pump pressure to pass through the pipes 40, the corresponding piston-valves 62 of the measuring units are moved forwardly to expel the oil from their measuring chambers into the respective bearings, said rod being held only momentarily and then released to allow the controlling valve and the hollow piston-valves to return to their initial retracted positions.

The operation of the lubricating system is as follows:

Assume the motor of the vehicle to be running so as to operate the pump 10, and the controlling valve 11 and measuring valves 13 to be in their normal positions shown by full lines in Fig. 2, the measuring chamber of each valve 13 being filled with oil, ready to expel its charge into the bearing. At this time, the oil is circulated through an unobstructed course including the pipe 25, the inlet passage 36 of the controlling valve, the inlet ports 34, 35 leading to the valve-cylinder 32, the piston-valve groove 44, the outlet port 39 and the return pipe 42 leading to the oil pan of the engine. Some of the oil is circulated at low pump pressure, say about 50 pounds, through the discharge pipe 18ª, connected with the low pressure chamber 16 of the pump, to the usual parts of the engine requiring lubrication. During this time, however, the piston-valves 62 of the measuring units remain in their retracted position. When it is desired to lubricate the various bearings on the vehicle chassis, the actuating rod knob 46 of the controlling valve is pushed forward, moving its piston valve 43 to the position shown by dotted lines in Fig. 2, which as before stated closes the ports 35, 39 and opens the ports 34, 38 to permit the oil at full pump pressure, say between 400 and 500 pounds, to be delivered through the pipes 40 to the corresponding measuring valves. This oil pressure forces each measuring valve piston 62 forwardly to expell the oil from its cylinder into the corresponding bearing. Should the operating rod of the controlling valve continue to be held in this position after the charge has been expelled from each measuring valve, its piston will remain in such forward position seated against the packing 66 but the pump pressure will be relieved owing to the yieldability of the pump-blade 27, which allows the oil, when it exceeds a predetermined pressure, say 500 pounds, to slip or leak past the resulting space between the ends of the blade and the chamber wall. When the actuating rod is released, the controlling piston-valve 43 returns to its initial or normal position and its groove 44 again places the ports 34, 35, 38 and 39 in communication, thereby permitting the oil to circulate at low pressure through the pipe 42 to the oil pan, and allowing the measuring valve pistons 62 to return to their initial position, during which time another charge of oil is taken into the respective measuring chambers in the manner previously described.

In the modified form of the controlling valve shown in Fig. 5, its piston-valve 68 is provided with an annular groove 69 which normally only registers with the inlet and outlet ports 35, 39 permitting the oil to circulate back to the oil pan and closing off the admission of oil through the port 38 to the measuring valves. When the valve 68 is moved forwardly, its groove registers with the companion inlet and outlet ports 34, 38, thereby delivering the oil at a high pressure to the measuring valves. In the type of measuring valve shown in connection with this modification, its piston-valve 70 has a spiral port 71 extending from end to end thereof. In order to relieve the pressure in the pipe 40 and permit the measuring valve piston to return to its retracted position as the controlling valve piston 68 returns to its normal position, the groove 69 of the latter is of the proper length to momentarily bridge the two sets of inlet and outlet ports 34, 35, 38 and 39 during the initial part of its return stroke. During this period, the measuring valve piston is allowed to be unseated from its packing 66, after which, owing to the reduction in the pressure in the pipe line leading to the controlling valve, said piston returns to its normal position, at the same time taking a charge of oil through its spiral groove in the necessary chamber.

I claim as my invention:—

1. In a lubricating system for motor vehicles, the combination with a plurality of bearings to be lubricated and a source of lubricant supply, of measuring devices for delivering a predetermined quantity of lubricant to said bearings, a pump communicating with said source of lubricant supply for delivering the lubricant to said measuring devices, and a controlling valve interposed between said pump and said measuring devices, said valve being constructed to normally permit the lubricant to circulate through it to said source of lubricant supply.

2. In a lubricating system for motor vehicles, the combination with a plurality of bearings to be lubricated and a source of lubricant-supply, of measuring devices for delivering a predetermined quantity of lubricant to said bearings, a pump communicating with said source of lubricant-supply for delivering the lubricant to said measuring devices, and a controlling valve interposed between said pump and said measuring devices, comprising a valve-body having an inlet connected with the pump and an outlet communicating with the measuring devices, a manually movable valve guide in said valve-body and having a port therein arranged to register with said inlet and said outlet, and a spring for normally holding said valve in a position in which its port registers with said inlet and said outlet.

3. In a lubricating system for motor vehicles, the combination with a plurality of bearings to be lubricated and a source of lubricant-supply, of measuring devices for delivering a predetermined quantity of lubricant to said bearings, a pump communicating with said source of lubricant-supply for delivering the lubricant to said measuring devices, and a controlling valve interposed between said pump and said measuring devices, comprising a valve-body having a cylinder including an inlet connected with the pump and an outlet communicating with the measuring devices, and a piston-valve movable in said cylinder and having a longitudinal passage for establishing communication between the opposite ends of said cylinder, said piston-valve also having a port therein arranged to register simultaneously with said inlet and said outlet.

4. In a lubricating system for motor vehicles, the combination with a plurality of bearings to be lubricated and a source of lubricant-supply, of measuring devices for delivering a predetermined quantity of lubricant to said bearings, a pump communicating with said source of lubricant-supply for delivering the lubricant to said measuring devices, and a controlling valve interposed between said pump and said measuring devices, comprising a valve-body having a cylinder including an inlet connected with the pump and an outlet communicating with the measuring devices, a piston-valve movable in said cylinder and having a longitudinal passage for establishing communication between the opposite ends of said cylinder, said piston-valve also having a port therein arranged to register simultaneously with said inlet and said outlet, and an actuating rod for the piston-valve extending through one end of said valve-body and abutting against the opposing end of said valve.

5. In a lubricating system for motor vehicles, the combination with a plurality of bearings to be lubricated and a source of lubricant-supply, of measuring devices for delivering a predetermined quantity of lubricant to said bearings, a pump communicating with said source of lubricant-supply for delivering the lubricant to said measuring devices, and a controlling valve interposed between said pump and said measuring devices, comprising a valve-body having an inlet communicating with the pump and a pair of outlets, one of said outlets communicating with the measuring devices and the other with the source of lubricant-supply, and a valve movable in said valve-body and having a port arranged to register with said inlet and said pair of outlets in one position of said valve and with said inlet and one of said outlets in the other position thereof.

6. In a lubricating system for motor vehicles, the combination with a plurality of bearings to be lubricated and a source of lubricant-supply, of measuring devices for delivering a predetermined quantity of lubricant to said bearings, a pump communicating with said source of lubricant-supply for delivering the lubricant to said measuring devices, and a controlling valve interposed between said pump and said measuring devices, comprising a valve-body having an inlet communicating with the pump and a pair of outlets arranged side by side, one of said outlets communicating with the measuring devices and the other with the source of lubricant-supply, and a valve movable lengthwise in said valve-body and having an annular groove intermediate its ends, said groove forming a port normally connecting said inlet with both of said outlets and abnormally connecting said inlet with that outlet leading to the measuring devices.

7. A lubricating system for automobile bearings and the like, comprising a source of lubricant supply, measuring devices for delivering a predetermined quantity of lubricant to the bearings, a high and low pressure pump having an inlet communicating with said lubricant supply and a high pressure outlet and a low pressure outlet, a conduit connecting the high pressure pump-outlet with the bearing to be lubricated, and a controlling valve interposed in said conduit and having an outlet leading to said source of lubricant supply, said valve permitting the idle circulation of the high pressure lubricant therethrough in one position thereof and through the discharge end of said conduit to the bearing in the other position thereof.

8. In a lubricating system for motor vehicles, the combination with a plurality of bearings to be lubricated, of measuring devices for delivering a predetermined quantity of lubricant to said bearings, a high and low pressure pump for delivering the lubricant to said measuring devices and having intercommunicating high and low pressure chambers, each containing pumping elements and an inlet and an outlet, the outlet of the low pressure chamber being in communication with the inlet of the high pressure chamber; a valve casing interposed between the outlet of the high pressure chamber of said pump and said measuring devices, said casing having ports for permitting the free circulation of the lubricant therethrough at a low pump pressure and for permitting the passage of lubricant at a high pump pressure to the measuring devices, and a valve in said casing for controlling the passage of lubricant through said ports, respectively, said valve being arranged to normally permit free circulation of the lubricant through its casing and ports at a low pump pressure.

9. In a lubricating system for motor vehicles, the combination with a plurality of bearings to be lubricated, of measuring devices for delivering a predetermined quantity of lubricant to the bearings, a source of lubricant supply, a high and low pressure pump in communication with said lubricant supply and having corresponding high and low pressure outlets, a valve casing interposed between the high pressure pump-outlet and said measuring devices, said casing having a pair of ports communicating at their inlet ends with said high pressure pump-outlet, the outlet end of one port communicating with the source of lubricant supply and the corresponding end of the other port communicating with said measuring devices, and a valve in said casing for controlling the circulation of the lubricant through said ports, respectively, said valve being normally positioned to permit the oil to circulate in a free path from the pump to the source of lubricant supply.

10. In a lubricating system for motor vehicles, the combination with a pluarlity of bearings to be lubricated under a high and low pressure, a source of lubricant supply, a high and low pressure pump in communication with said source of supply and having corresponding high and low pressure outlets, fittings applied to those bearings to receive lubricant at a high pressure, said fittings including means for controlling the admission and expulsion of lubricant to and from the same, and a controlling valve interposed between the high pressure pump-outlet and said bearing-fittings, said valve having ports for permitting the free circulation of lubricant at a low pressure from the pump to the source of supply and for permitting the passage of lubricant from said pump to said bearing-fittings at a high pressure.

CHARLES W. MANZEL.